Sept. 5, 1950 B. M. OLIVER 2,521,125

WAVE TRANSMISSION NETWORK

Filed Aug. 21, 1947 2 Sheets-Sheet 1

INVENTOR
B. M. OLIVER
BY
N. S. Ewing
ATTORNEY

Sept. 5, 1950 B. M. OLIVER 2,521,125

WAVE TRANSMISSION NETWORK

Filed Aug. 21, 1947 2 Sheets-Sheet 2

INVENTOR
B. M. OLIVER
BY
ATTORNEY

Patented Sept. 5, 1950 2,521,125

UNITED STATES PATENT OFFICE 2,521,125

WAVE TRANSMISSION NETWORK

Bernard M. Oliver, New York, N. Y., assignor to Bell Telephone Laboratories, Incorporated, New York, N. Y., a corporation of New York Application August 21, 1947, Serial No. 769,853

14 Claims. (Cl. 178—44)

This invention relates to transmission networks, particularly to two terminal impedence equalizers.

An object of the invention is to shift the impedance characteristic of a network along the frequency scale without altering the shape of said impedance characteristic.

A further object of the invention is to maintain the impedance characteristic of a two-terminal network symmetrical about a carrier despite fluctuations in the frequency of this carrier.

A feature of the invention is a network which provides impedance equalization about a carrier frequency by switching of the polarity of currents impressed thereon at the carrier frequency.

Another feature of the invention is the provision of two-terminal networks whose impedance characteristics vary sharply in the neighborhood of a carrier frequency.

Referring to the figures of the drawing.

In equalizing servo systems as well as in other applications, it is often necessary to obtain a transmission characteristic which varies sharply in the neighborhood of the carrier frequency being used. Attempts to obtain such a characteristic by means of networks formed of resonant and anti-resonant circuits have heretofore encountered difficulties when the required sharpness of the desired transmission characteristic is increased, to wit:

(1) The operation of the equalizer network becomes increasingly dependent on the frequency stability of the carrier.

(2) The required Q's of the resonant circuit components become higher than ordinarily obtainable in practice.

In case such difficulties prove too great, an alternative method for securing the desired transmission characteristics about the carrier is to demodulate the signal from the carrier and equalize at signal frequencies, and then to remodulate up to the carrier again. This demodulation and remodulation can be accomplished either electrically or mechanically depending on the carrier frequency used.

In a broad aspect, the invention contemplates the connection of an impedance element or network to a circuit carrying waves modulated upon a carrier wave, through a reversing or commutating switch, which operates at the frequency of the carrier wave, each time the carrier wave passes through zero or an approximately zero value.

In accordance with an embodiment of the present invention, two-terminal networks with impedance characteristics about a median frequency are achieved, characterized by a capability of shifting in the frequency scale without change of shape as the carrier fluctuates or shifts. This is accomplished by commutating the polarity of the input to a two-terminal impedance of conventional form by means of a bridge of unilaterally conductive elements operated at a carrier frequency from a source connected to one diagonal thereof. A signal applied to the other diagonal will encounter an impedance characteristic developed by the combination of two-terminal reactance and bridge which will shift along with shifts in the carrier frequency. From another aspect, the network in accordance with the invention provides impedance equalization by electrical demodulation of the carrier, equalization at signal frequencies and remodulation on a reflux basis, so that the same elements serve both as the demodulating and remodulating means, to thereby effect a reduction of, and economy in, parts.

Figure 1:
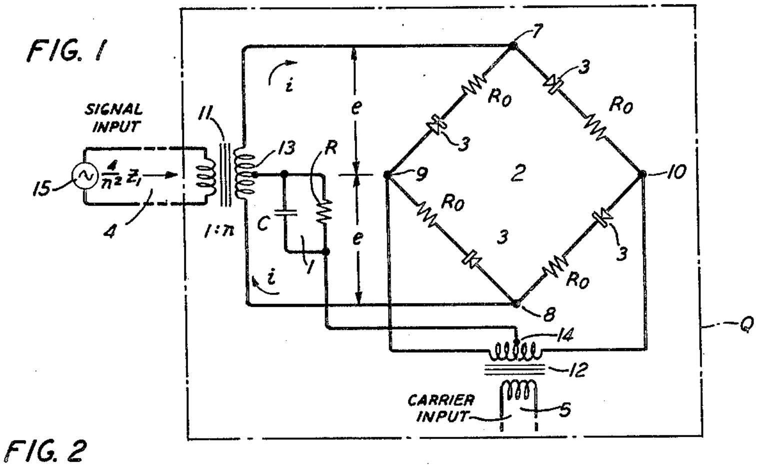
Fig. 1 shows an impedance network including a polarity switching diode bridge.

Referring to Fig. 1, the equalizer network in accordance with the invention comprises in combination an impedance network 1 and a diode bridge 2, commutated at carrier frequencies.

The bridge 2 is of the type normally used as a demodulator or phase detector, such as is disclosed in the United States Patent No. 2,086,601, issued July 13, 1937, to R. S. Carruthers. The bridge 2 comprises identical diode tubes 3 in the arms thereof as shown in Fig. 1, each diode being in series with a resistor $R_0$. In lieu of diodes, other unilateral conductive devices may be used such as cuprous oxide rectifiers, selenium rectifiers, silicon or germanium crystals and the like.

In the diode bridge 2, two inputs are provided, namely, a signal input 4 and a carrier input 5, applied to the diagonals of the bridge 7—8 and 9—10, respectively, by the transformers 11, 12 as shown in Fig. 1. A two-terminal impedance network 1 which, by way of example, is shown as comprising a condenser C and resistor R in parallel, is inserted between center taps 13 and 14 of the secondary coils. Other forms of two-terminal impedances may be used as subsequently disclosed in Figs. 3, 4, 5. These impedance networks or impedance branches are made up of linear-bilateral reactive and resistive components. Linear-bilateral is thus taken to describe a component which presents the same impedance characteristic to current pulses flowing in either direction through the component. An impedance branch comprising these components may be termed symmetrically conductive, meaning that the current response of the branch is independent of the polarity of the applied voltage and that the average current through said branch over a complete cycle of applied alternating voltage is zero.

The combination of circuits comprising component impedance 1, bridge 2, and carrier circuit 5, represents a two-terminal network, whose impedance characteristic as seen by the signal source 15 will automatically follow fluctuations or frequency changes in the carrier.

The mode of operation of the circuit in accordance with the invention and the nature of the transmission characteristic provided thereby for equalization or other purposes may be more fully understood from the following analysis:

Assume in the circuit of Fig. 1 that each resistor $R_0$ is made much greater than the resistance of its associated diode 3 in the conducting direction. For the purpose of analysis, the diode resistance is included as part of $R_0$. Normally the resistance of the diodes 3 in the non-conducting direction is substantially infinite, as is well known. The carrier amplitude is assumed to be larger than the signal amplitude, the latter being derived from a high impedance source 15.

Under these conditions, the carrier of frequency $$\frac{\omega_0}{2\pi}$$

performs a switching operation in the bridge 2, namely, it renders either the top two diodes or the bottom two diodes of Fig. 1 conducting upon alternate half cycles.

If at $t=0$, sinusoidal current of frequency $$\frac{\omega_0}{2\pi}$$

is suddenly applied to the signal input at 4, then the current flowing in either half of the secondary may be represented as $$i=I_1 (\sin \omega_0 t) \qquad (1)$$

If this signal at 4 is in phase with the carrier input at 5, and under the assumption that the reactance of C at $\omega_0$ is much less than R, i. e., $\omega_0 CR \gg 1$, then the charge stored in condenser C each half cycle will be $$\Delta q=\left[\int_0^{\frac{\pi}{\omega_0}} I_1 \sin \omega_0 t dt\right]=\frac{2I_1}{\omega_0} \qquad (2)$$

and the average current this represents is:

$$I=\frac{\Delta q}{\frac{\tau}{2}}=\frac{\Delta q \omega_0}{\pi}=\frac{2}{\pi}I_1 \qquad (3)$$

The voltage across C due to this current is obviously:

$$E=IR(1-\epsilon^{-\delta_1 t})=\frac{2}{\pi}I_1 R(1-\epsilon^{-\delta_1 t}) \text{ wherein } \delta_1=\frac{1}{RC} \qquad (4)$$

This voltage gets switched from one-half of the balanced secondary of the signal input transformer 11 to the other every half cycle. The amplitude, i. e., the half peak to peak of the square wave thus produced across each half of the secondary is also E, and the fundamental component of the square wave has the amplitude $$\frac{4E}{\pi}$$

The total fundamental voltage across each half of the secondary 11, including that due to the direct application of the signal to either pair of the individual resistances $R_0$ connected in parallel between terminals (7—9) and (7—10) has the amplitude (or envelope)

$$E_1=\left[\frac{R_0}{2}+\frac{8}{\pi^2}R(1-\epsilon^{-\delta_1 t})\right]I_1 \qquad (5)$$

The complete expression for the fundamental component of $e_1$ is therefore:

$$e_1=I_1\left[\frac{R_0}{2}+\frac{8}{\pi^2}R(1-\epsilon^{-\delta_1 t})\right]\sin \omega_0 t \qquad (6)$$

This is the same wave as would have been obtained had the signal current $I_1 \sin \omega_0 t$ been applied to an impedance $Z_{(p)}$, where $$Z_{(p)}=\frac{R_0}{2}\,\frac{p+\delta_1+\frac{8}{\pi^2}\frac{2}{R_0 C}}{p+\delta_1} \text{ and } p=j(\omega-\omega_0) \qquad (7)$$

Figure 2:
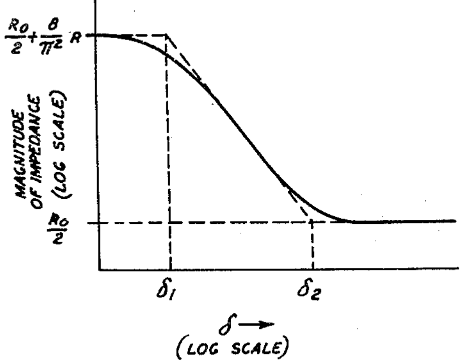
Fig. 2 represents the corresponding impedance characteristic.
Figure 7:
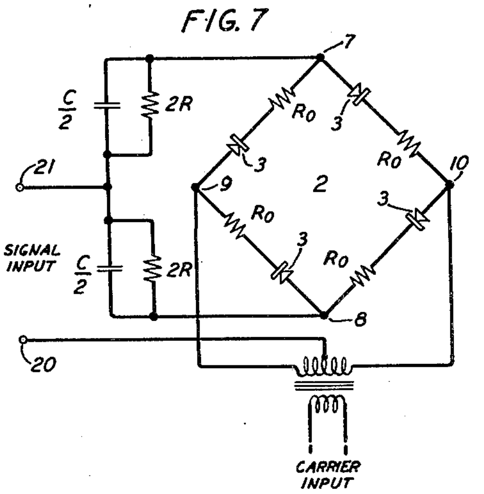
Fig. 7 is a further modification of the improved network in accordance with the invention.

In other words the signal equalization which will be achieved by the two-terminal network at terminals 4 (Fig. 1) is expressible, on a modulation frequency basis, as the impedance characteristic graphically shown in Fig. 2. Here $\delta=\omega-\omega_0$, the modulation frequency and $$\delta_1=\frac{1}{RC} \text{ and } \delta_2=\frac{1}{RC}+\frac{8}{\pi^2}\frac{2}{R_0 C}$$

On a carrier basis, the impedance presented by the two-terminal network at terminals 4 is the characteristic curve or graph shown in Fig. 2 mirrored about the carrier frequency. Should the carrier frequency shift, the equalizer characteristic would also shift so that the effective impedance at the carrier frequency would always be $$\frac{R_0}{2}+\frac{8}{\pi^2}R$$

and, remote from the carrier frequency, simply $$\frac{R_0}{2}$$

the "corners" being at $\omega_0-\delta_2$, $\omega_0-\delta_1$, $\omega_0+\delta_1$, $\omega_0+\delta_2$.

With a square wave signal input, the same sort of analysis can be made with substantially the same results except that the $$\frac{8}{\pi^2}$$

disappears from the previous equations and from the expression of the effective impedance above.

The impedance looking into the primary of the input coil 11 is of course $$\frac{4}{n^2}$$

times that seen by each half of the secondary, wherein $n$ is the turns ratio of the transformer.

Figure 3:
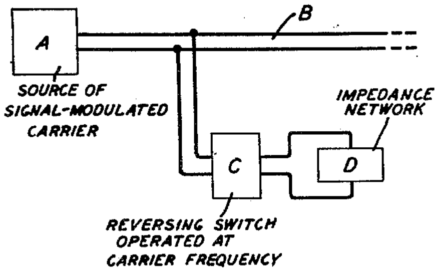
Fig. 3 illustrates schematically the circuits of the invention in their broader aspects.

Fig. 3 illustrates schematically the broad aspects and operating principles in accordance with the invention.

The rectangle A represents a multifrequency source, such as a source of modulated waves. In one specific application, the source may, for example, be the cathode-anode terminals of a pentode tube in a multistage amplifier, and B may be the following interstage circuit.

The reversing switch C, which operates at the carrier frequency and reverses whenever the carrier passes substantially through zero value, corresponds to the diode bridge 2 of Fig. 1, switched by the carrier input 5. The network D corresponds to the impedance network 1, illustrated in Fig. 1, or to the various forms of impedance networks illustrated in Figs. 4, 5, 6 respectively.

Figure 3A:
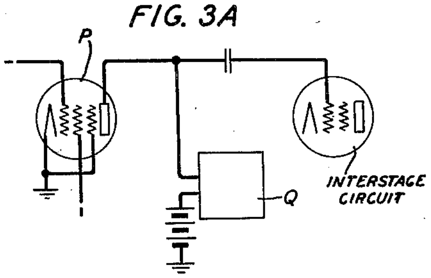
Fig. 3A shows an amplifier circuit in which the circuit of Fig. 1 is incorporated.

Fig. 3A shows schematically the circuit of Fig. 1 incorporated in a form of multistage amplifier described with respect to Fig. 3. The anode current from the pentode tube P supplies the signal frequencies to the primary of transformer 11, and thence to the circuit of Fig. 1, as represented by Q, the dotted line box. The pentode P is coupled to the interstage circuit in the conventional manner.

Figure 4:
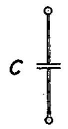
Figs. 4, 5 and 6 show modified component impedances for use with the diode bridge.
Figure 4A:
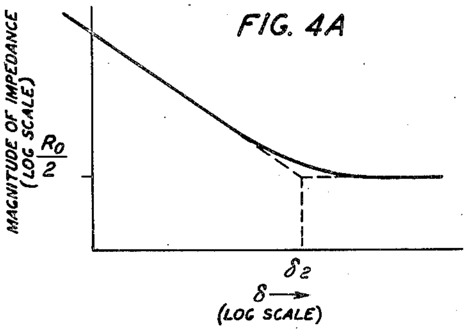
Figs. 4A, 5A, 6A, represent the impedance characteristics obtained with the diode bridge and the impedances of Figs. 4, 5, 6, respectively.
Figure 5:
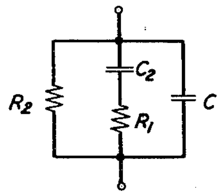
Figure 5A:
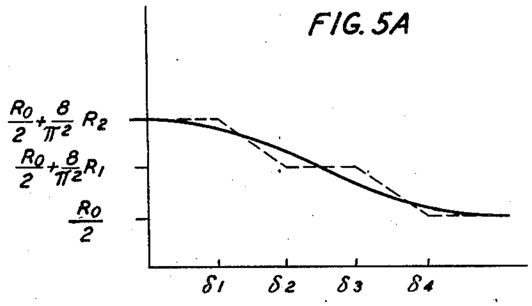
Figure 6:
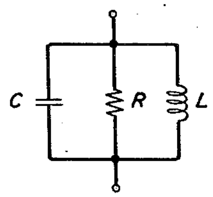
Figure 6A:
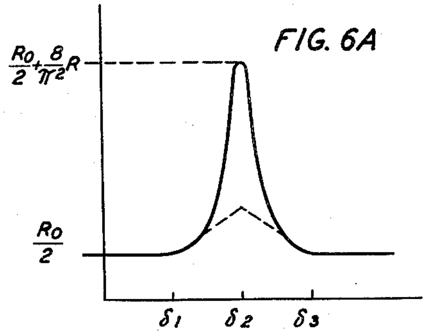

Various impedance characteristics, such as, for example, those illustrated in Figs. 4A, 5A and 6A, may be obtained by the use of substitute networks shown in Figs. 4, 5, 6, respectively, in the direct current branch 13-14 of the equalizer. Examples of impedance components which may be used in lieu of the RC circuit of Fig. 1 are presented in Figs. 4, 5, 6, to wit, a single condenser C, a two-terminal network of parallel impedances $R_2$, C, $R_1$ $C_2$ or an L, C, R parallel tuned circuit. These networks should all have a driving point impedance low compared with $R_0$ at the carrier frequency $$\frac{\omega_0}{2\pi}$$

and at all harmonics thereof.

The corresponding equalization transmission characteristics are shown in Figs. 4A, 5A, 6A, respectively.

In each case the impedance characteristic obtained is simply $$Z(\omega)=\frac{R_0}{2}+\frac{8}{\pi^2}Z_n(\omega-\omega_0)$$

where $Z_n(\omega-\omega_0)$ is the impedance of the network used at the frequency $\delta=\omega-\omega_0$.

The figures show $Z(\omega)$ plotted against $\omega-\omega_0$.

It is also possible to remove the input transformer 11 and to replace the RC network in the branch 12-14 (Fig. 1) with two networks $$\left(\frac{C}{2}, 2R\right)$$

of twice the impedance, as shown in Fig. 6, connected from one of the signal input leads 20, 21 to each of the corners 7—8 of the bridge 2.

The circuit of Fig. 6 may be further modified by replacing the two resistances 2R across the condensers C/2 by a single resistance shunting the input terminals 20, 21. For a square wave, the value of the single resistor would be $$\frac{RR_0}{R-R_0}$$

For a sine wave input, the required value for the single resistor would be $$\frac{\frac{8}{\pi^2}RR_0}{\frac{8}{\pi^2}R-R_0}$$

Various forms of switching device for commutating the polarity may be utilized in accordance with the invention, such as a relay, vibrating reed, gas tube switch, vacuum tube switch or the like.

It should also be understood that applicant's improved two-terminal impedance network previously described may be incorporated as a component element in the synthesis of generalized four-terminal networks, without departing from the spirit of the invention.

What is claimed is:

1. A two-terminal impedance device comprising a symmetrically-conductive branch of at least one linear-bilateral impedance, means for applying a signal thereto, and means for periodically commutating the polarity of said signal, whereby the impedance characteristic may shift as the period of commutation fluctuates.

2. A two-terminal impedance device comprising in combination a bridge of unilaterally conductive devices, a source of carrier frequency for commutating the conductivity of said devices in pairs, said source being connected to one diagonal, and a symmetrically-conductive impedance branch of the type described connected to the bridge, and having a signal source operatively connected to said two-terminal impedance.

3. A two-terminal impedance device comprising a bridge of unilaterally conductive devices connected thereto, an impedance network connected to the bridge, said network being two-terminal and having a current response thereof independent of polarity of an applied voltage, an alternating current source connected to said bridge for commutating the conductivity of said bridge periodically and controlling the polarity of a second current applied to said impedance network.

4. The structure of claim 3, wherein said currents have phase relation of an integral number of $\pi$ radians and have a common frequency.

5. In combination a two-terminal impedance device comprising a bridge of unilateral conductive elements, an impedance branch consisting of linear-bilateral components connected thereto, and means for periodically commutating the conductivity of pairs of said elements, and a source of signals, whose frequency range includes said period of commutation, applied to said bridge and impedance branch.

6. A two-terminal impedance device adapted to be operated about a mean carrier frequency comprising a symmetrically-conductive impedance branch and a bridge, means for rendering each half of said bridge alternately conductive and non-conductive at the carrier frequency, whereby a symmetrical impedance characteristic about said carrier is developed.

7. The structure of claim 6 and a separate source of signals applied to said bridge, said signals including the carrier frequency.

8. A two-terminal impedance device comprising an impedance branch comprising linear-bilateral components such that the average current through said branch is substantially zero for complete cycle of an alternating applied voltage, a source of multifrequency signals applied thereto, periodic switching means adapted to control the polarity of said signals applied to said impedance branch, said period being contained in said multifrequency source, whereby said impedance characteristic may shift unaltered in shape with fluctuations in said period.

9. In combination, a source of modulated carrier wave signals, a circuit connected thereto, and a symmetrically-conductive impedance branch connected to said circuit through a reversing switch, said switch being operated periodically at the frequency of said carrier wave.

10. The structure of claim 9, wherein said impedance branch is a single reactance.

11. The structure of claim 9, wherein said impedance branch is resonant.

12. In combination, a source of modulated carrier wave signals, a transmission circuit for said signals connected to said source, and a symmetrically-conductive branch of at least one linear-bilateral impedance connected to said circuit, a commutating switch associated with said branch and adapted to operate periodically at the frequency of said carrier wave.

13. In combination, a signal source of a first frequency, a symmetrically-conductive impedance branch, a signal source of a second frequency, and means including said second source for commutating signal of said first source at a frequency of said second signal source and applying said commutated signal to said impedance branch, whereby said branch presents an impedance to said signal source dependent upon the difference between said first frequency and said second frequency.

14. In combination, a source of multifrequency signals comprising a modulation frequency modulated upon a carrier wave subject to substantial frequency variations, a load connected to said source, means for presenting a predetermined impedance characteristic to said signals independent of said carrier variations, comprising an impedance branch connected to said load, a reversing switch interposed between said branch and said load, and a source of signals having the frequency of said carrier and subject to said same frequency variations thereof separately connected to said switch to operate said switch at said carrier frequency, whereby an impedance characteristic symmetrical about said carrier is presented to said signal as said carrier fluctuates.

BERNARD M. OLIVER.

REFERENCES CITED

The following references are of record in the file of this patent:

UNITED STATES PATENTS

| Number | Name | Date |
|---|---|---|
| 2,293,628 | Reiling | Aug. 18, 1942 |

FOREIGN PATENTS

| Number | Country | Date |
|---|---|---|
| 460,238 | Great Britain | Jan. 25, 1937 |